United States Patent Office 3,398,182
Patented Aug. 20, 1968

3,398,182
FLUOROCARBON URETHANE COMPOUNDS
Richard A. Guenthner, White Bear Lake, and James D. Lazerte, St. Paul, Minn., assignors to Minnesota Mining & Manufacturing Company, St. Paul, Minn., a corporation of Delaware
No Drawing. Continuation-in-part of application Ser. No. 204,640, June 22, 1962. This application Jan. 26, 1967, Ser. No. 611,821
4 Claims. (Cl. 260—455)

ABSTRACT OF THE DISCLOSURE

Fluorocarbon compounds which contain a highly fluorinated oleophobic and hydrophobic terminal portion and a different nonfluorinated oleophilic portion linked together by a urethane radical obtained by reacting together an isocyanate and a highly fluorinated organic compound containing an active hydrogen. Surfaces coated with such fluorocarbon compounds are oleophobic and hydrophobic and the coating is durable, resisting removal by abrasion.

---

This application is a continuation-in-part of our application SN 204,640, filed June 22, 1962, now abandoned.

This invention relates to new and useful fluorocarbon compositions and their method of preparation and surfaces treated therewith.

The use of fluorocarbon compounds to impart water and oil repellency to various materials is well known.

An object of this invention is to provide a new class of fluorocarbons which are especially useful for imparting oil repellency and stain resistance to a substrate at low concentrations.

Another object of this invention is to provide new fluorocarbons which when applied to a surface impart oil repellency and this useful characteristic is retained by the surface of the article so treated even after prolonged wear and abrasive action. Thus the compounds are durable.

A further object of this invention is to provide new carbon compounds which may be applied to a surface in solvent solutions thereby rendering the surface oil repellent at low concentrations of the fluorocarbon treating agent.

In accordance with our discovery, fluorocarbon urethane compounds having the structural formula:

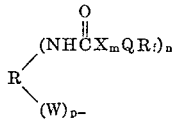

have been found to be useful to accomplish the above stated objects as well as those which will become apparent from the other portions of the specification.

In the above formula R is an organic radical having 2 to about 30 carbon atoms containing hydrocarbon radicals adjacent the valence bonds in the connecting chain above, such as a hydrocarbon radical, an alkoxy (up to 6 carbon atoms) substituted or normally gaseous halogen substituted hydrocarbon radical, a hydrocarbon ether radical, and a radical derivable from the reaction product of a hydrocarbon isocyanate or alkoxy substituted (up to 6 carbon atoms) or normally gaseous halogen substituted hydrocarbon isocyanate with a hydrocarbyl alcohol, mercaptan, phenol, thiophenol, carboxylic acid or amine;

$R_f$ is a monovalent fluorinated aliphatic radical containing 3 to 20 carbon atoms having a perfluoromethyl terminal group (that portion most distant from the valence bond) and having at most one hydrogen atom or chlorine atom substituent per two carbon atoms and at most other than carbon atoms in the skeletal chain oxygen atoms or trivalent nitrogen atoms bonded only to a carbon atom, the remaining elements of the radical being carbon atoms and fluorine atoms, the skeletal structure of such fluoroaliphatic radical being straight chained, branch chained or alicyclic;

X is sulfur, oxygen, imino (NR″) group, sulfonamido (SO$_2$NR″) group, or carbonamido (CONR″) group;

Q is a sulfonyl- or carbonyl-containing divalent linking radical, substantially free from water solubilizing groups, ethylenic groups, esters groups of carboxylic acid and groups less stable to hydrolysis than an ester group of carboxylic acid, such divalent radical including

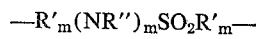

and —R′$_m$NR″COR′$_m$—, being preferred;
and/or an alkylene radical from 1 to 12 carbon atoms and R″ is hydrogen or an alkyl radical containing 1 to 20 carbon atoms, the acyl amido-containing radical,

and —R′$_m$NR″COR′$_m$—, being preferred;

W is an isocyanate radical or the radical —NHCOR‴ where R‴ corresponds to an organic radical of from 1 to 24 carbon atoms derived from a hydrocarbyl alcohol, mercaptan, phenol, thiophenol, carboxylic acid or amine;

$m$ is 0 or 1;
$n$ is an integer from 1 to 3;
$p$ is an integer from 1 to 6, preferably 1 to 3;

and the sum of $n+(p-1)$ is 2 to 6, preferably 2 or 3.

Fluorocarbon adducts of this invention have a melting point below 250° C. (preferably 50 to 175° C.) They represent adducts of functional organic compounds and contain a highly fluorinated terminal group such as a —(CF$_2$)$_{3-17}$CF$_3$ group linked to an organic nucleus, preferably through a —S—N—C— or C—N—C— grouping, said adduct being free of functional groupings selected from the group consisting of water solubilizing groups, ethylenic groups, ester groups of carboxylic acids, and groups less stable to hydrolysis than an ester of a carboxylic acid. Water solubilizing groups are exemplified by acid, hydroxyl, amine, and unsubstituted amide functional groupings.

Web surfaces which contain between about 0.1 and about 1% by weight of fluorine derived from the fluorinated terminal group of said adducts possess an oil repellency, as defined hereinafter, of at least 50.

Not only do surfaces treated in accordance with this invention show improvement over known treatments at comparable levels of treatment, but they retain these desirable characteristics after being subjected to extreme wear and abrasive action (durability). Prior to this invention this problem represented an unsolved problem which prevented the use of fluorocarbon treatments in numerous applications where oil repellency is a highly desirable characteristic. Illustrative applications are the treatment of specialized papers, upholstery, carpeting, etc. In many instances the initial characteristics of the materials of this type treated with the best available fluorocarbon compound or polymer exhibited the desired properties immediately after being treated but upon being subjected to abrasive action during the course of normal usage, the desirable characteristics were lost, whereas the teachings of this invention make the retention during normal usage of the greatly improved oil repellency. This improvement is to be distinguished from the loss of useful fluorocarbon characteristics during laundering which was solved concurrently but in a different fashion, thereby permitting the first commercially practical "wash and wear" treatment. This latter discovery is disclosed in the application of Bolstad, Sherman and Smith, SN 832,490, filed Aug. 10, 1959, now U.S. Pat. No. 3,068,187, entitled "Segmented Fluorine-Containing Copolymers." The compositions of this invention may, of course, be used in admixture with the segmented copolymers disclosed in the aforesaid application as well as other fluorinated treating agents.

It has been suggested that the adducts found useful in this invention orientate themselves on the surface of the treated article so as to remain adhered to the article surface with the fluorocarbon tail extended and that because of their low melting point, the heat generated by any abrasive action during normal usage melts the adducts, in a manner such that a sufficient amount of the fluorocarbon is retained by the treated substance to provide it at all times with an outermost surface treated with the fluorinated adduct. This latter phenomenon may be described as a "self-healing" characteristic, whereby articles treated in accordance with this invention have the unique characteristic of possessing excellent oil repellency even after the initially treated surfaces have been worn away. This phenomenon is best illustrated by a dynamic test in which the surface of a felt cloth or similar material of at least one-eighth inch thickness is treated with the fluorocarbon treating compounds of this invention. The initial surface exhibits good oil repellency and this oil repellency is retained after the initial surface has been abraded away with sandpaper to the extent that the cloth is reduced to only one-half or less of its original thickness. On the other hand, if the originally treated cloth is cut with scissors on a diagonal, only the surface has the requisite oil repellency and the oil is readily absorbed by the sub-surface areas that become oil repellent if the top treated surface is abraded away.

Another surprising feature regarding the performance of the compounds of this invention which were found to be so unexpectedly effective as an oil repellency treating agent, is the fact that they contain an oil soluble nucleus, i.e. a polyfunctional organic portion exemplified by a hydrocarbon radical of the preferred compounds. Such polyvalent hydrocarbon radical may be straight chained (alkylene) or a combination straight and aromatic hydrocarbon radicals (alkaryl or aralkyl) which contain from 4 to 30 carbon atoms. If a prediction were to be made, it would be that such a nucleus would greatly impair the oil repellency characteristics of the fluorocarbon but all evidence is to the contrary.

The fluorocarbon adducts of this invention may be synthesized in various ways. In general, they may be prepared from fluorocarbon compounds containing active hydrogen obtained from reactive functional groupings as exemplified by acids, alcohols, amines, mercaptans, and amides. Such fluorocarbon compounds are reacted with chemically reactive organic isocyanates to prepare the desired adducts. Each of these fluorocarbon compounds useful as an intermediate contains a reactive hydrogen as defined by Zerewitinoff in Berichte, 40, 2023 (1907); (also see Kahler, J.A.C.S., 49, 3181, 1927) and as such are reactive with the isocyanate radical. The invention has been described in detail with respect to fluorocarbon urethanes prepared from hydrocarbon isocyanates because they have been found to function the best of all compounds tested and can be prepared from known and readily available compounds.

The isocyanate may be reacted with the fluoroaliphatic containing compound followed by reaction of the adduct with another compound containing a reactive hydrogen which does not contain a highly fluorinated terminal group. In this manner the oil repellency that can be obtained from a single fluorocarbon tail is extended for many uses since the effectiveness of these compounds is generally more than half as effective as the corresponding fluorocarbon diadduct.

It is also possible to react the fluoro-aliphatic containing compound with only one of the isocyanate groups of a diisocyanate. In this manner the compound contains a reactive isocyanate group which may in turn be reacted with other compounds or may be employed as a means of uniting the compound with the substrate to be treated. For instance, in the treatment of substrates containing reactive Zerewitinoff hydrogen atoms, such as nylon, cellulose and other organic materials, the reactive isocyanate group may be made to react with the Zerewitinoff active hydrogen of the substrate and in this manner the compound of this invention is added directly to and becomes an integral part of the substrate treated. In this regard it may be desirable to "block" the isocyanate group, such as by reacting it with a phenol. This "blocked" isocyanate group is thereafter released by heating the compound at an elevated temperature to produce the phenol and the desired isocyanate group.

The adducts of this invention may be applied as a surface treatment by known methods of coating, such as spraying, roll coating, brushing or dipping from an organic solvent solution or anionic, cationic and nonionic emulsion. They may be applied from readily available organic solvents such as alcohols, ketones, ethers and chlorinated solvents. They may be used as the sole component in the treating liquid or as a component in a complex multi-ingredient formulation such as cosmetic articles, waxes, polishes, cleaning mixtures and treating agents. For instance, excellent water and oil repellency and soil resistance are obtained on textile fabrics which are treated simultaneously with the adducts of this invention and conventional finishes, such as mildew preventatives, moth resisting agents, crease resistant resins, lubricants, softeners, fat liquors, sizes, flame retardants, antistatic agents, dye fixatives, and water repellents. The following lists set forth specific types of treating agents for use in combination with the adducts of this invention:

Crease resisting resins:
urea-formaldehyde resins, ethylene urea-formaldehyde resins, melamine-formaldehyde resins, triazine-formaldehyde resins, epoxy resins, and polyglycol acetals.

Sizes:
polyethylene glycols, polyethylene, dimethylpolysiloxanes, amines and amides derived from fatty acids, and ethylene oxide condensation products of such amines and amides.

Water repellents:
waxes, polyvalent metal salts of fatty acids, silicon resins, chromium complexes of fatty acids, N-alkyl amidomethyl pyridinium salts, and melamine-formaldehyde resin condensates with amides of fatty acids.

In the treatment of paper the adducts may be present as an ingredient in a wax, starch, casein, elastomer, or wet strength resin formulation. Aqueous emulsions of the fluorocarbon compositions are especially useful in the treatment of paper. By mixing the adduct in an aqueous or oil type paint formulation it may be applied effectively to unpainted asbestos siding, wood, metal and masonry. In the treatment of floors and tile surfaces and like substrates the adducts may be applied by their incorporation in an emulsion or solution.

Fibrous, porous and continuous surfaces may be treated with the adducts of this invention. Illustrative articles to be treated are papers, textiles, glass, wood, leather, fur, asbestos, bricks, concrete, metals, ceramics, plastics, painted surfaces, sponges and plaster. Because of the ability of the surfaces treated with these adducts to withstand abrasive action and advantages incident to the repellency to oil and water and their resistance to soiling imparted by coating them with the adducts of this invention, preferred classes of articles to be treated are papers and textiles. Illustrative papers are carbonizing tissue, wallpaper, asphalt laminates, liner board, cardboard and papers derived from synthetic fibers.

In the treatment of such articles as paper, leather and textiles 0.001 to 5% (preferably 0.005 to 0.5%) by weight of the fluorocarbon adduct based on the weight of the article produces the desired surface characteristics. Illustrative textiles which can be advantageously treated with the adducts of this invention are those based on natural fibers, e.g. cotton, wool, mohair, linen, jute, silk, ramie, sisal, kenaf, etc., and those based on synthetic fibers; e.g. rayon, acetate, acrylic ("Acrilan," "Orlon"), polyester ("Dacron," and "Kodel"), Saran, azylon, nytril ("Darvan"), nylon, spandex ("Fiber K" experimental), vinal ("Vinylon"), olefin ("Reevon"), vinyon ("Avisco Vinyon") and glass fibers. (The above designations of synthetic fibers are the proposed generic terms set up by the Federal Trade Commission.) Illustrative textiles are wearing apparel, upholstery, draperies, and carpeting.

The fluorocarbon adducts of this invention have been designated by the Roman numerals of the startaing materials as they are listed in the following tables, e.g.

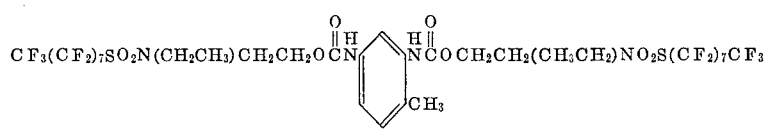

Adduct V—A—V (the diadduct)

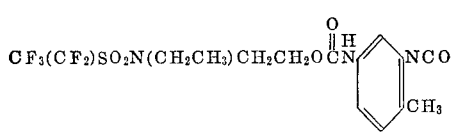

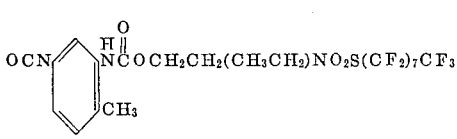

Adduct V—A (the monoadduct)

The fluorocarbon compounds of this invention, as shown in Table I below, contain a fluoro-aliphatic terminal group and an active hydrogen-containing terminal group and may be represented by the general formula $R_fQY$ in which $R_f$ and Q are defined as hereinbefore and Y is the active hydrogen-containing terminal group such as a hydroxyl group (—OH), a carboxyl group (—COOH)

mercapto group (—SH), amino group (—NHR″), carbonamido group (—CONHR″) or a sulfonamido group (—SO$_2$NHR″) in which R″ corresponds to the definition previously given.

TABLE I

Fluorocarbon compounds

I. $CF_3(CF_2)_7SO_2N(CH_3)CH_2CH_2OH$
II. $CF_3(CF_2)_3SO_2N(CH_3)CH(CH_3)CH_2OH$
III. $CF_3(CF_2)_3SO_2N(CH_2CH_3)CH_2CH_2OH$
IV. $CF_3(CF_2)_3SO_2N(CH_3)CH_2CH(CH_3)OH$
V. $CF_3(CF_2)_7SO_2N(CH_2CH_3)CH_2CH_2OH$
VI. $CF_3(CF_2)_9SO_2N(CH_2CH_2CH_3)CH_2CH_2OH$
VII. $CF_3(CF_2)_7SO_2N(CH_2CH_2CH_3)CH_2CH_2OH$
VIII. $CF_3(CF_2)_7SO_2N(CH_3)(CH_2)_5SH$
IX. $CF_3(CF_2)_7SO_2N(C_2H_5)CH_2COOH$
X. $CF_3(CF_2)_7SO_2N(C_2H_5)(CH_2)_6OH$
XI. $CF_3(CF_2)_7SO_2N(C_2H_5)(CH_2)_{11}OH$
XII. $CF_3(CF_2)_7SO_2N(C_4H_9)(CH_2)_4OH$
XIII. $CF_3(CF_2)_7SO_2N(CH_3)(CH_2)_4OH$
XIV. $CF_3(CF_2)_7SO_2N(CH_2CH_3)CH_2CH_2NH_2$
XV. $[CF_3(CF_2)_7SO_2N(CH_2CH_3)CH_2CH_2]_2NH$
XVI. $CF_3(CF_2)_7SO_2N(CH_2CH_3)CH_2CH_2N(CH_3)H$
XVII. $CF_3(CF_2)_7SO_2N(CH_3)CH_2CH_2SH$
XVIII. $CF_3C_6F_{10}C_2F_4SO_2N(CH_3)CH_2CH_2OH$
XIX. $C_2F_5O(C_2F_4O)_3CF_2CONHC_2H_4OH$
XX. $CF_3(CF_2)_7SO_2N(C_3H_7)CH_2OCH_2CH_2CH_2OH$

XXI 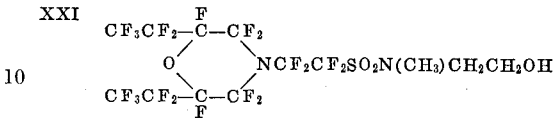

XXII. $CF_3CF(CF_2Cl)(CF_2CF_2)_6CF_2CON$
$(CH_3)CH_2CH_2OH$
XXIII. $CF_3CF(CF_2H)$
$(CF_2CF_2)_6CF_2CONHCH_2CONH_2$
XXIV. $CF_3(CF_2)_7SO_2N(CH_3)CH_2CH_2SO_2N(C_{18}H_{37})H$
XXV. $CF_3CF(CF_2H)$
$(CF_2CF_2)_6CH_2CH_2CH_2CONHCH_2SO_2N(CH_3)H$
XXVI. $CF_3(CF_2)_6SO_2CH_2CH_2OH$

XXVII. $CF_3(CF_2)_6COCH_2CH_2OH$
XXVIII. $C_7F_{15}CON(C_2H_5)C_2H_4OH$

The hydrocarbon constituent containing active hydrogen which may be used in addition to the fluorocarbon starting compound is defined substantially the same as the fluorocarbon compound with the exception that the fluorinated aliphatic group ($R_f$) is a monovalent non-fluorinated aliphatic group R‴ and may be represented by the following formula: R‴Y where each of the designations are defined as above, as shown in Table II below:

TABLE II

Hydrocarbon compounds

LI. $CH_3(CH_2)_{16}CH_2OH$
LII. $CH_3CHOHCH_3$
LIII. $(CH_3CH_2CH_2CH_2)_2NH$
LIV. $CH_3(CH_2)_{16}COOH$

LV. 

LVI. $CH_3(CH_2)_6CH_2OH$
LVII. $CH_3CH_2OH$
LVIII. $CH_3CH_2CH_2CH_2NH_2$
LIX. $CH_3OH$
LX. $CH_2OHCHOHCH_2OH$
LXI. $CH_2OHCH_2OH$

LXII. 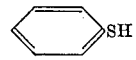

LXIII. $CH_3(CH_2)_7SH$

LXIV. 

LXV. $CH_3(CH_2)_{16}CH_2NH_2$
LXVI. $CH_3(CH_2)_3CH(CH_2CH_3)COOH$

The isocyanate starting material may be either monoisocyanate or polyisocyanate such as a diisocyanate represented by the following formula: $R(NCO)_{n+p-1}$ in which R, n and p are as previously defined, examples of which are shown in Table III below:

TABLE III.—REACTIVE COMPOUNDS

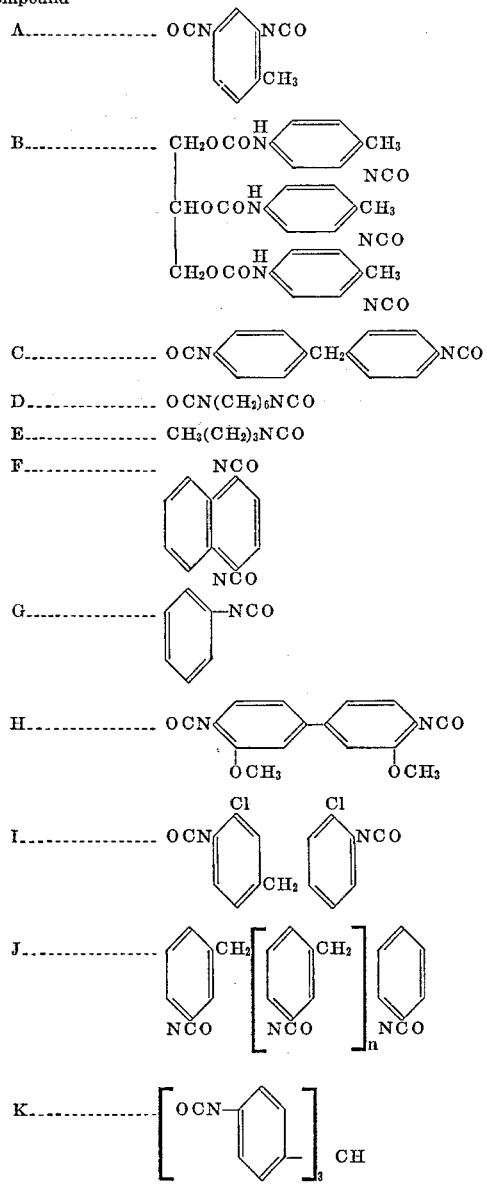

As can be seen, intermediate compounds in Table I and II contain terminal functional groups which have reactive Zerewitinoff hydrogen atoms. Upon reaction with the compounds of Table III, these terminal groups determine the constituency of X. Where X is oxygen, the intermediate compound was an alcohol. Where X is sulfur, the intermediate compound was a mercaptan. Where X is an imino radical, the intermediate compound was an amine. Where X is a sulfonamido or a carbonamido, the intermediate acyl amide compound was a sulfonamide or a carbonamide, respectively. Where X is not present ($m=0$), the intermediate or starting compound was an acid. If a primary amine was employed, the imino radical is $$\overset{H}{\underset{}{-N-}}$$

If a secondary amine was employed, the hydrogen atom of the imino radical is replaced with the alkyl substituent of the secondary amine.

From the above Table II, it is also apparent that the preferred aliphatic hydrocarbon compounds represented by amines, mercaptans, alcohols and carboxylic acids may contain from one up to eighteen or twenty-four carbon atoms and that the phenols and thiophenols may be substituted with an alkyl or alkoxy group of up to 6 carbon atoms.

The following examples are illustrative of the preparation of the compositions of this invention in which all "parts" are expressed as parts by weight and all "percentages" are expressed as percent by weight unless specified otherwise.

The water repellency of the treated fabrics was measured by Standard Test No. 22–52, published in the 1952 Technical Manual and Yearbook of the American Association of Textile Chemists and Colorists, Vol. XXVIII, page 136. The "spray rating" is expressed on a 0 to 100 scale, wherein 100 is the highest possible rating.

The oil repellency test is based on the different penetrating properties of two hydrocarbon liquids, mineral oil ("Nujol") and n-heptane. Mixtures of these two liquids are miscible in all proportions and show penetrating properties which increase with an increase in the n-heptane content of the mixture.

The oil repellency rating numbers were chosen to correspond with the A.A.T.C.C. Standard Spray Ratings which are now in use for testing water repellent finishes.

| Oil Repellency Rating | Percent Heptane [1] | Percent Mineral Oil [1] |
|---|---|---|
| 100+ | 60 | 40 |
| 100 | 50 | 50 |
| 90 | 40 | 60 |
| 80 | 30 | 70 |
| 70 | 20 | 80 |
| 50 | 0 | 100 |
| 0 | | ([2]) |

[1] Percent by volume.
[2] No holdout to "Nujol."

To measure oil repellency of a treated fabric, swatches are cut and placed flat on a table. A drop of each mixture is gently placed onto the surface of the fabric. The number corresponding to that mixture containing the highest percentage heptane which does not penetrate or wet the fabric after three minutes contact is considered the oil repellency rating of the sample.

The "kit numbers" as set forth in the following examples are an expression of hydrocarbon repellency of a treated article as measured by various mixtures of castor oil, toluene and heptane. The "kit number" assigned any given sample is the number of the designated composition containing the least amount of castor oil that will stand on the surface of the treated article for 15 seconds in the form of drops without penetrating the exposed area underneath. The parts by volume (p.b.v.) ratios of the mixtures as they correspond to the assigned "kit number" are as follows:

| Kit No. | Castor Oil (p.b.v.) | Toluene (p.b.v.) | Heptane (p.b.v.) |
|---|---|---|---|
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

EXAMPLE 1

117 grams (0.2 mol) of Compound VII and 17.4 grams (0.1 mol) of Compound A were reacted in the presence of two drops of triethylamine at a temperature of about 60° C. The reaction mixture, adduct VII–A–VII (M.P. 60° C.) was dissolved in methyl ethyl ketone (5 parts) and ethylene dichloride (95 parts) as a 0.5% solution. Cloth strips were dipped in the solution, pressed free of solution, and air dried. Oil repellency ratings were as follows:

Fabric: Oil repellency
- Gabardine _____ 100+
- Dacron-wool _____ 100+
- Flannel _____ 100+
- Cotton _____ 100+

After laundering, the oil repellency for the fabrics was:

Fabric: Oil repellency
- Gabardine _____ 90
- Dacron-wool _____ 90
- Flannel _____ 100
- Cotton _____ 70

Suede leather dipped in the solution and air dried gave a 100+ oil repellency rating.

Brushing a solution (0.5%) of the urethane on wood and drying made the wood surface resistant to staining by oil, water and ink. When used as a sealer-primer under varnish, these same properties are then found in the varnish overcoat.

Kapok after being dipped in the urethane solution and tumble dried became oil and water resistant, remaining buoyant in both oil and water.

EXAMPLE 2

58.5 grams (0.1 mol) of Compound VII was added to 17.4 grams (0.1 mol) of Compound A in 76 grams of anhydrous ethyl acetate. The mixture was heated at 40–50° C. for several hours and then diluted to 1% solids with carbon tetrachloride. This solution was an effective fluorocarbon solution of the adduct VII–A. Sheepskin suede leather, dipped into the solution, pressed free of excess solution and dried in an oven at 80° C., had an oil rating of 100. Wool and cotton fabrics treated in the same manner give a 100 oil rating and a 60–90 spray rating.

EXAMPLE 3

To a glass flask equipped with a stirrer and condenser were added Compound V (2 mols, 1142 grams) and dried toluene (1316 grams). The mixture was heated to 60° C. with stirring. Compound A (174 grams, 1 mol) was added, followed by a catalytic amount of triethylamine. An exotherm resulted and heating was continued for several hours at 80°–100° C. The resulting solid product V–A–V (M.P. 110° C.) was isolated by removal of the toluene solvent under vacuum.

Table I below shows the results obtained in the treatment of papers with adduct V–A–V by immersion in a solution of the adduct in an acetone-methyl chloroform mixture.

TABLE I

| Solution Concentration | Kit Number | Turpentine Resistance (minutes) | | SAE 10 Oil Resistance, 80° F. |
|---|---|---|---|---|
| | | Flat | Creased | Creased (days) |
| 0.2 | 5 | 15 | 1 | 1–2 |
| 0.1 | 4 | 5 | 0 | 1 |

Table II lists the results obtained in the treatment of paper with adduct V–A–V at various concentrations from an aqueous emulsion. Runs 1–A, 1–B and 1–C were treated with the emulsion by immersion and air dried at 80° F. Runs 2–A, 2–B and 2–C were treated with the emulsion by immersion and dried on a Williams sheet drier at 200° F.

TABLE II

| Runs | Solution Concentration | Kit Number | Turpentine Resistance (minutes) (creased) average of 3 samples |
|---|---|---|---|
| 1–A | 0.3 | 6+ | 50+ |
| 1–B | 0.2 | 6 | 20 |
| 1–C | 0.1 | 5+ | 0 |
| 2–A | 0.3 | 7+ | 56+ |
| 2–B | 0.2 | 6+ | 49+ |
| 2–C | 0.1 | 6+ | 0 |

Table III below shows the relative performance of adduct V–A–V and a chromium complex of a fluorocarbon monocarboxylic acid in the treatment of liner board.

TABLE III

| Type of Treatment | | Resistance to SAE 10 Oil at 80° F. | |
|---|---|---|---|
| | | Flat | Scored |
| Chromium complex | Shallow 1 side 0.20% | 7 days | 0 |
| Do | Shallow 1 side 0.14% | 1 day | 0 |
| Do | Shallow 1 side 0.06% | 45 min | 0 |
| Adduct V–A–V | Shallow 1 side 0.09% | 12 days | 0 |
| Do | Shallow 1 side 0.06% | 9 days | 0 |
| Do | Shallow 1 side 0.04% | 4 days | 0 |
| Do | Shallow 1 side 0.015% | 45 min | 0 |
| Chromium complex | Saturation 0.5% | 7 days | [1] 2 |
| Do | Saturation 0.25% | 45 min | [2] 5 |
| Adduct V–A–V | Saturation 0.10% | 80+ days | [3] 80+ |
| Do | Saturation 0.05% | 45 days | [3] 45 |

[1] Hours.
[2] Minutes.
[3] Days.

Liner board treated on both sides with adduct V–A–V can be glued in that the surface permits good adhesion with adhesives but at the same time the fluorocarbon treatment prevents the adhesives from penetrating into the surface of the liner board.

The addition of adduct V–A–V to polyvinyl acetate and starch-casein coating compositions improved the oil resistancy and stain resistance of the coatings prepared from them.

EXAMPLE 4

The compounds listed in Table IV were prepared in a manner similar to the preparation of adduct V–A–V in Example 3.

TABLE IV

| Adduct | Melting Point (° C.) | Oil Repellency [1] | Spray Rating [1] |
|---|---|---|---|
| I–A–I | 85 | 100 | 100 |
| II–A–II | <22 | 100+ | 70 |
| III–A–III | <22 | 90 | 70 |
| IV–B–IV | 30 | 50 | 70 |
| V–C–V | 125 | 100 | 70+ |
| VI–A–VI | 70 | 100 | 70 |
| IX–A–IX | <150 | 100 | 80 |
| V–A–LI | | 100 | |
| V–A–LII | | 100 | 80 |
| V–A–LIII | | 100 | 80 |
| V–A–LIV | | 100 | 90 |
| V–D–V | <150 | 100 | 80 |
| V–E | | 0 | 70 |
| V–F–V | | 100 | 90 |
| V–G | | 0 | 70 |
| I–A–LIX | 152 | 100 | 90 |
| V–A–LVIII | 95 | 100+ | 80 |
| V–A–LVII | | 100+ | 80 |
| V–A–LIX | 86 | 100 | 80 |
| XXVIII–A–XXVIII | | 80 | 50 |

[1] Wool Gabardine.

EXAMPLE 5

This example shows the large scale preparation of the fluorochemical diadduct V–A–LI.

To a glass-lined kettle was charged Compound V (2,855 grams) and toluene (4,000 grams). The contents were heated to 140° F. with stirring. Toluene diisocyanate (a mixture of the 2,4 and 2,6 isomers) (870 grams)

and phenyl mercury acetate (8.7 grams) were added. A reaction exotherm raised the temperature to 150° F. Heat was applied and the reaction continued at 175° F. for two hours. The kettle contents were cooled to 140° F. and octadecyl alcohol (1352.5 grams) was added. The temperature was raised to 200° F. and continued for two hours. At the conclusion of the reaction no free isocyanate groups could be detected by titration with a standard butyl amine solution. Toluene (2,000 grams) was distilled from the reaction vessel under vacuum. The remaining solution in the kettle was drained and the solid diurethane V–A–LI (4,980 grams) was recovered by drying in a forced air oven at 180° F.

EXAMPLE 6

The diester of Compound V and terephthalic acid (M.P. 164° C.) was prepared. When applied to paper in the same manner as the treatment of paper with adduct V–A–V in Table I of Example 3, the repellency to turpentine of the treated paper was substantially less than for the adduct V–A–V. The repellency to SAE 10 oil was only slightly less than for the adduct V–A–V.

EXAMPLE 7

In the treatment of paper the compounds of this invention produce results which are substantially improved over those which could be obtained in any manner by fluorochemical treatments previously available. Excellent turpentine resistance is obtained when 0.15 weight percent of adduct V–A–V is applied to a paper whereas 0.75 weight percent of the chromium complex of a fluorocarbon monocarboxylic acid, the heretofore most effective fluorochemical for treating paper, was required to obtain similar results.

Treated papers which were tested for oil resistance with SAE 10 oil at 80° F. also showed significant improvement. For instance, 0.1% by weight of Compound V–A–V applied to a 50 pound kraft sheet gave more than 45 days of oil resistance, both flat and creased. In order to obtain comparable results it was necessary to apply 0.4% by weight of the heretofore best fluorochemical for this type of treatment.

Asphalt laminates (treated and untreated) were heated for 10 minutes at 125° C., 6 days at 35° C., 10 days at 75° C., and 60 days at 45° C. In each instance the untreated asphalt laminate had darkened to a significant extent whereas 0.1% by weight of Compound V–A–V prevented any darkening of the laminate. Comparable results were obtained by treating the asphalt laminate with 0.4% by weight of a chromium complex of a fluorocarbon monocarboxylic acid which heretofore had been the best available treating agent for this purpose.

Bleached kraft paper was treated with 0.1 weight percent of Compound V–A–V and dipped in paraffin at 70° C. to produce a wax paper completely protected against capacity loss. Comparable results could be obtained by treating the paper with 0.3 weight percent of the heretofore best known fluorochemical for this purpose.

In the treatment of carbonizing tissue the compounds of this invention are twice as effective as any compounds heretofore available as exemplified by the results obtained from carbonizing tissue treated with Compound V–A–V. Good results are obtained, however, by combining the adducts of this invention with chromium complexes of the type shown in U.S. Patent Nos. 2,662,835 and 2,934,450.

The calendering of papers which have been treated with the compounds of this invention does not adversely affect the effectiveness of the treatment whereas paper which has been treated with chromium complexes of fluorocarbon monocarboxylic acids are adversely affected by calendering. Previously the heating of papers either during or after they had been treated with the fluoro carbon compound, such as by calendering them over hot rolls, adversely affected the effectiveness of the treatment whereas when heat is applied to papers treated in accordance with this invention the desired properties are frequently enhanced.

Emulsions of the adducts of this invention are useful in unfilled and filled alkaline coatings for paper. Illustrative binders used in the coating compositions are starch, casein and acrylic polymers. Illustrative minerals which may be used in the coating compositions with the fluorocarbon compounds of this invention are clay, clay-titanium dioxide mixtures and calcium carbonate. The compounds of this invention have also been found to be effective beater additives in the manufacture of oil resistant paper.

EXAMPLE 8

A methyl chloroform solution of Compound V–A (1%) and phenyl mercury octoate (0.02%) as a catalyst for reacting the isocyanate radical with hydroxyl radicals of cellulose was employed to treat cotton fabrics. After being padded in the solution and dried at 100° C. for 15 minutes, the cotton fabrics had an oil rating of 100 and a spray rating of 80. After five launderings of the fabrics, both the oil and spray ratings for the fabrics was 50.

EXAMPLE 9

A methyl chloroform-methyl ethyl ketone solution of Compound V–A (0.85%) and triethylamine (0.01%) as a catalyst for reacting the isocyanate radical with hydroxyl radicals of cellulose was employed to treat cotton and wool fabrics. After being padded in the solution and dried at 120° C. for 15 minutes, the cotton fabrics had an oil rating of 100 and spray rating of 90. After three launderings of the cotton fabrics, the oil rating was 70 and the spray rating was 50. After being padded in the solution and dried at 120° C. for 5 minutes, the oil rating was 90 and the spray rating was 90.

EXAMPLE 10

Compound XIV (57.6 parts) dissolved in toluene (106 parts) was warmed to 35° C. and Compound A (8.7 parts) was added. Due to the exotherm of the reaction the temperature rose to 55° C. The reaction mixture was then heated to 75° C. for 30 minutes with stirring. Upon cooling, the substituted diurea precipitated out of solution. After being filtered and dried a yield of 65 parts of the diurea, XIV–A–XIV (melting point 157° C.), was recovered.

Cotton and wool fabrics were padded in a warm 1% solution of the diadduct, XIV–A–XIV, in 50:50 solvent mixture of ethyl acetate-methylchloroform, nipped at 30 lbs., and allowed to air dry overnight. The cotton fabric had an oil rating of 90 and a spray rating of 80. The wool fabric had an oil rating of 90 and a spray rating of 90+.

EXAMPLE 11

This example illustrates the preparation and use of a diadduct (diurethane) "blocked" on one end with phenol.

A. Preparation.—Compound C (0.1 mole, 25 parts) was dissolved in ethylene dichloride (25 parts). Compound VII (0.1 mole, 58.5 parts) dissolved in ethylene dichloride (58.5 parts) was added to the diisocyanate solution. The reaction was carried out at 60° C. for 2 hours with stirring.

After the addition of phenol (0.1 mole, 9.4 parts) and triethylamine (0.5 part) as a catalyst, the reaction was carried out for another two hours at 60° C. After vacuum drying, the reaction slurry produced 92.5 parts of phenol adduct.

B. Treatment.—A treating solution was prepared by dissolving 0.5% by weight of the phenol adduct in a 90:10 mixture of perchloroethylene and acetone. Fabrics were padded in this solution, nipped at 20 lbs., and dried as indicated in Table V.

TABLE V

| Fabric | Air Dried | | Oven Dried [1] | | Oven Dried [1] Oil | [1] Laundering Spray |
|---|---|---|---|---|---|---|
| | Oil | Spray | Oil | Spray | | |
| Wool gabardine | 100+ | 100 | 100+ | 100 | 90 | 90 |
| Polyester worsted tropical | 100+ | 80 | 100 | 100 | 80 | 80 |
| Wool flannel | 100 | 90 | 100 | 100 | 90 | 90 |
| Cotton jeans cloth | 100+ | 70 | 100 | 100 | 90 | 90 |

*At 150° C. for five minutes (the odor of the liberated phenol was apparent in the area of the oven).

EXAMPLE 12

This example illustrates the improved results obtained by combining the compounds of this invention with other fluorochemical compositions.

In this example the Compound V–A–V in a 20% solids emulsion (ketone-water containing a cationic emulsifier) was combined with a solution of a segmented fluorochemical copolymer shown in Example XII of the aforementioned Patent No. 3,068,187 of Bolstad, Sherman & Smith, a melamine-formaldehyde crease-resistant resin and magnesium chloride, as a catalyst. Cotton knit goods were padded in this formulation, nipped at 20 pounds and cured at 150° C. for 10 minutes. The initial oil rating of the fabric was 100+ and the initial spray rating was 100. After 5 launderings and tumble dryings the oil rating was 70 and the spray rating was 80.

EXAMPLE 13

A segmented copolymer of the type taught in the aforementioned Patent No. 3,068,187 of Bolstad, Sherman and Smith was prepared as follows:

(1) A prepolymer of tridecyl acrylate (15 parts) and methyl methacrylate (20 parts) was prepared.

(2) To this prepolymer was grafted the acrylate of Compound V (47.5 parts), tridecyl acrylate (15 parts) and isoprene (2.5 parts).

A 0.7% methyl chloroform solution of a mixture containing 75% of the Compound V–A–V and 25% of this segmented copolymer was applied to cotton and nylon fabrics. The fabric was padded with the solution, nipped at 30 pounds and air dried. Both fabrics had an oil rating of 100+. The nylon after abrasion had an oil rating of 100. The same fabrics treated in the same manner with 0.7% methyl chloroform solution of the segmented copolymer also had an initial oil rating of 100+ but after abrasion had an oil rating of 50.

The abrasion of the samples was by Grade 320 silicon carbide waterproof sandpaper using the American Association of Textile Chemists and Colorists, Standard Test 8–1961 and a Model CM–1 Crockmeter.

EXAMPLE 14

This example shows the in situ formation of the compositions of this invention on the surface of the treated articles.

A. Wool and cotton fabrics were sprayed with a 1% toluene solution of Compound XIV and air dried. A 1% perchloroethylene solution of Compound C was then sprayed on the fabrics and air dried overnight. The oil rating for both fabrics was 100+ and the spray rating for both was 100.

B. Table VI shows the results obtained by the in situ formation of fluorocarbon compounds with a methyl chloroform solution containing 0.3% of Compound I, 0.39% of Compound C and 0.02% of phenyl mercuric acetate.

TABLE VI

| | Initial Oil Rating | Initial Spray Rating | Oil Rating After 3 Launderings | Spray Rating After 3 Launderings |
|---|---|---|---|---|
| Oven cure: | | | | |
| Cotton | 100+ | 100 | 90 | 80 |
| Wool | 90 | 100 | -- | -- |
| Nylon | 90 | 100 | 50 | 80 |
| Air Dried: Cotton | 120 | 80 | 50 | 70 |

All fabrics were padded with the solutions, nipped at 30 pounds and cured in a forced draft oven at 140° C. for five minutes or air dried for 24 hours.

EXAMPLE 15

In the in situ formation of the compound on the substrate, the reactants may be emulsified in an aqueous system to facilitate their use where a solvent system would not be feasible or desirable. Compound C, blocked with phenol, (6 parts) and Compound XIV (2 parts) were emulsified in toluene (100 parts) and water (134 parts) using a cationic-nonionic emulsifier system. Then this emulsion was applied to wool gabardine and cured at 150° C. for 10 minutes. The resulting fabric after being rinsed with water and dried, gave a 70 oil rating and a 70 spray rating. Application of this amount of Compound XIV alone to the fabric gave no oil repellency.

EXAMPLE 16

This example exemplifies the increased abrasion resistance of the fluoroinated urethanes of this invention.

The equipment used in this example was a 10 H.P. polishing lathe to which was attached a mechanism which moved a metal workpiece across the buffing wheel front surface. The metal workpiece consisted of a ½" x 6" x 6" sheet of 1018 mild steel. Two forces were applied to the abraded edge of the workpiece—a transverse motion to achieve a smooth cut across the piece and a force opposing the buffing wheel to achieve constant cutting power. Cutting compound was applied by a spray nozzle to the buffing wheel above the cutting area. The application rate was intermittent at selected time intervals.

The buffing wheel was composed of four sections of a 17" diameter bias buff. Each section contained 16 plys of a 86 x 93 thread cotton fabric.

The cutting compound was a conventional abrasive used for such metal removing tasks.

The fluorinated urethanes, the adduct V–A–V of Example 3 and the adduct V–A–LI of Example 4, were separately applied to two buffing wheels from a solution containing 0.4% (weight) solids in trichloroethane. A total of 10 grams of fluorinated urethane was applied to each wheel. Uniform treatment was achieved by constant wheel rotation in a treating tank. The buff sections were dried thoroughly at room temperature (80° F.).

To insure uniformity of experimental operation, the following controls were followed rigorously:

(a) Constant motor load current maintained at 10 amps (no load current—7.5 amps).
(b) Cutting compound application rate was 3 lbs. per hr.
(c) Buff wheel speed was at 1182 r.p.m.

Buff performance is a combination of two characteristics: (1) removal of buff fabric from the wheel surface and, (2) removal of metal from the steel workpiece. The ratio used for comparison in this example was the metal removed per inch of buff diameter loss (oz./in.).

Treatment of wheel:

| | Metal removal rate |
|---|---|
| Conventional without fluorochemical | 3.09 |
| V–A–V coated | 3.75 |
| V–A–XI coated | 4.78 |

As can be seen from the above, the wheels treated with the fluorinated urethanes showed greater abrasion resistance than the conventional wheel.

We claim:
1. Fluorocarbon compounds having the formula

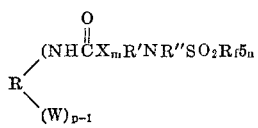

where
R is a radical of from 2 to 30 carbon atoms free from nonaromatic unsaturation selected from the group consisting of an unsubstituted hydrocarbon radical, an alkoxy substituted or chlorine substituted hydrocarbon radical, and a radical of the structure corresponding to that derived from the reaction of a hydrocarbon isocyanate or alkoxy substituted or chlorine substituted hydrocarbon isocyanate with the reactive hydrogen of a hydrocarbyl alcohol, hydrocarbyl mercaptan, hydrocarbyl phenol, hydrocarbyl thiophenol, hydrocarbyl carboxylic acid or hydrocarbyl amine, R' is a phenylene or an alkylene radical, or both, containing 1 to 12 carbon atoms, R" is hydrogen or an alkyl radical containing 1 to 20 carbon atoms, $R_f$ is a perfluoroalkyl radical containing 3 to 20 carbon atoms, X is selected from the group consisting of sulfur, oxygen, imino group, sulfonamido group and carbonamido group, W is selected from the group consisting of isocyanate radical and —NHCOR''' where R''' corresponds to a structure of an organic monovalent radical of 1 to 24 carbon atoms free from nonaromatic unsaturation derived from a hydrocarbyl alcohol, hydrocarbyl mercaptan, hydrocarbyl phenol, hydrocarbyl thiophenol, hydrocarbyl carboxylic acid or hydrocarbyl amine by removal of active hydrogen, $m$ is 0 or 1, $n$ is an integer of from 1 to 3, $p$ is an integer of from 1 to 3, and the sum of $n+(p-1)$ is from 2 to 3.

2. Fluorocarbon compounds having the formula

where
R is a radical of from 2 to 30 carbon atoms free from nonaromatic unsaturation selected from the group consisting of an unsubstituted hydrocarbon radical, an alkoxy substituted or chlorine substituted hydrocarbon radical, and a radical of the structure corresponding to that derived from the reaction of a hydrocarbon isocyanate or alkoxy substituted or chlorine substituted hydrocarbon isocyanate with the reactive hydrogen of a hydrocarbyl alcohol, hydrocarbyl mercaptan, hydrocarbyl phenol, hydrocarbyl thiophenol, hydrocarbyl carboxylic acid or hydrocarbyl amine, R' is a phenylene or an alkylene radical, or both, containing 1 to 12 carbon atoms, R" is hydrogen or an alkyl radical containing 1 to 20 carbon atoms, $R_f$ is a perfluoroalkyl radical containing 3 to 20 carbon atoms, X is selected from the group consisting of sulfur, oxygen, imino group, sulfonamido group and carbonamido group, $m$ is 0 to 1, and $n$ is on integer of from 2 to 3.

3. Fluorocarbon compounds having the formula

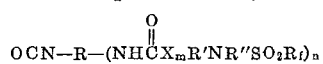

where
R is a radical of from 2 to 30 carbon atoms free from nonaromatic unsaturation selected from the group consisting of an unsubstituted hydrocarbon radical, an alkoxy substituted or chlorine substituted hydrocarbon radical, and a radical of the structure corresponding to that derived from the reaction of a hydrocarbon isocyanate or alkoxy substituted or chlorine substituted hydrocarbon isocyanate with the reactive hydrogen of a hydrocarbyly alcohol, hydrocarbyl mercaptan, hydrocarbyl phenol, hydrocarbyl thiophenol, hydrocarbyl carboxylic acid or hydrocarbyl amine, R' is a phenylene or an alkylene radical, or both, containing 1 to 12 carbon atoms, R" is hydrogen or an alkyl radical containing 1 to 20 carbon atoms, $R_f$ is a perfluoroalkyl radical containing 3 to 20 carbon atoms, X is selected from the group consisting of sulfur, oxygen, imino group, sulfoamido group and carbonamido group, $m$ is 0 or 1, and $n$ is an integer of from 1 to 3.

4. Fluorocarbon compounds having the formula

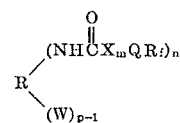

where
R is a radical of from 2 to 30 carbon atoms free from nonaromatic unsaturation selected from the group consisting of an unsubstituted hydrocarbon radical, an alkoxy substituted or chlorine substituted hydrocarbon radical, and a radical of the structure corresponding to that derived from the reaction of a hydrocarbon isocyanate or an alkoxy substituted or chlorine substituted hydrocarbon isocyanate with the reactive hydrogen of a hydrocarbyl alcohol, hydrocarbyl mercaptan, hydrocarbyl phenol, hydrocarbyl thiophenol, hydrocarbyl carboxylic acid or hydrocarbyl amine, Q is an acyl radical selected from the group of

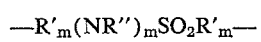

and $R'_m (NR'')_m COR'_m$—,

R' is a phenylene and/or an alkylene radical containing 1 to 12 carbon atoms,

R" is hydrogen or an alkyl radical containing 1 to 20 carbon atoms, $R_f$ is a monovalent fluorinated aliphatic radical containing 3 to 20 carbon atoms having a perfluoromethyl terminal group and at most other fluoride atoms one hydrogen atom or chlorine atom substituent for every two carbon atoms and at most other than carbon atoms in the skeletal chain not more than one oxygen atom or one trivalent nitrogen atom per two skeletal carbon atoms and bonded only to carbon atoms, X is selected from the group consisting of sulfur, oxygen, imino group, sulfonafido group and carbonamido group, W is selected from the group consisting of isocyanate radical and —NHCOR''' where R''' corresponds to a structure of an organic monovalent radical of 1 to 24 carbon atoms free from nonaromatic unsaturation derived from a hydrocarbyl alcohol, hydrocarbyl mercaptan, hydrocarbyl phenol, hydrocarbyl thiophenol, hydrocarbyl carboxylic acid or hydrocarbyl amine by removal of active hydrogen, $m$ is 0 or 1, $n$ is an integer of from 1 to 3, $p$ is an integer of from 1 to 6, and the sum of $n+(p-1)$ is from 2 to 6.

(References on following page)

References Cited

UNITED STATES PATENTS

| | | | |
|---|---|---|---|
| 2,803,656 | 8/1957 | Ahlbrecht et al. | 260—556 |
| 2,842,524 | 7/1958 | Herbst et al. | 260—408 |
| 2,911,390 | 11/1959 | Smith | 260—453 |

FOREIGN PATENTS 6414126  6/1956  Netherlands.

CHARLES B. PARKER, *Primary Examiner.*

D. R. PHILLIPS, *Assistant Examiner.*

UNITED STATES PATENT OFFICE
CERTIFICATE OF CORRECTION

Patent No. 3,398,182                                        August 20, 1968

Richard A. Guenthner et al.

It is certified that error appears in the above identified patent and that said Letters Patent are hereby corrected as shown below:

Column 1, lines 48 to 53, the portion of the formula reading "$(W)_{p-}$" should read -- $(W)_{p-1}$--. Column 2, line 16, "and $-R'_m NR"COR'_m-$, being preferred should read -- and $-R'_m(NR")_m COR'_m-$, in which R' is a phenylene --. Column 3, line 44, "alkaryl or aralkyl" should read -- alkarylene or aralkylene --. Column 5, lines 32 to 37, the portion of the formula reading:

$(CF_2)SO_2$     should read     $(CF_2)_7 SO_2$

Column 11, line 57, "capacity" should read -- opacity --. Column 15, lines 3 to 7, the portion of the formula reading:

$R_f 5_n$     should read     $R_f)_n$ line 69, "on" should read -- an --. Column 16, line 8, "hydrocarbyly" should read -- hydrocarbyl --; line 46, "and $R'_m$" should read -- and $-R'_m$ --; line 52, "other fluoride" should read -- other than flourine --; line 61, "sulfonafido" should read -- fuldonamido --.

Signed and sealed this 17th day of March 1970.

(SEAL)
Attest:

EDWARD M. FLETCHER, JR.
Attesting Officer

WILLIAM E. SCHUYLER, JR
                                               Commissioner of Patents